(12) United States Patent
Samprathi et al.

(10) Patent No.: US 10,416,996 B1
(45) Date of Patent: Sep. 17, 2019

(54) SYSTEM AND METHOD FOR TRANSLATING AFFLICTION PROGRAMMING INTERFACES FOR CLOUD PLATFORMS

(71) Applicant: Nutanix, Inc., San Jose, CA (US)

(72) Inventors: Ravikanth Samprathi, San Jose, CA (US); Chhavi Upadhyay, San Jose, CA (US); Hemanth Kumar Mantri, San Jose, CA (US); James Sodini, San Jose, CA (US); Akshay Khole, San Jose, CA (US); Uzui Li, San Jose, CA (US); Ray Xie, San Jose, CA (US); Srinivas Bandi Ramesh Babu, Mountain View, CA (US)

(73) Assignee: NUTANIX, INC., San Jose, CA (US)

( * ) Notice: Subject to any disclaimer, the term of this patent is extended or adjusted under 35 U.S.C. 154(b) by 0 days.

(21) Appl. No.: 15/991,048

(22) Filed: May 29, 2018

(51) Int. Cl.
*G06F 9/54* (2006.01)
*G06F 8/76* (2018.01)
*G06F 9/455* (2018.01)
*H04L 29/08* (2006.01)

(52) U.S. Cl.
CPC ............ *G06F 8/76* (2013.01); *G06F 9/45558* (2013.01); *G06F 9/54* (2013.01); *H04L 67/10* (2013.01)

(58) Field of Classification Search
CPC .............................. G06F 9/45533; G06F 9/541
USPC .............................................. 718/1; 719/328
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 9,772,866 B1 | 9/2017 | Aron et al. |
| 9,935,825 B2 * | 4/2018 | Aswathanarayana ........................ H04L 41/0806 |
| 10,148,493 B1 * | 12/2018 | Ennis, Jr. ............ H04L 41/0803 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jan. 12, 2016), from https://nutanixbible.com/.

(Continued)

*Primary Examiner* — Andy Ho
(74) *Attorney, Agent, or Firm* — Foley & Lardner LLP

(57) ABSTRACT

A system and method include receiving a request to call a requested application programming interface (API) at a target cloud computing platform. The system and method further include determining that the requested API is unsupported by the target cloud platform. The system and method further include generating a set of workflows associated with the requested API. The system and method also include generating a set of tasks common to the plurality of cloud platforms including the target cloud platform based on the set of workflows. The system and method also include generating a set of target APIs associated with the target cloud platform based on the set of tasks and an identity of the target cloud platform. The system and method also include communicating the set of target APIs t to the target cloud platform.

26 Claims, 6 Drawing Sheets

(56) References Cited

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 3, 2017), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.
Poitras, Steven. "The Nutanix Bible" (Jun. 8, 2017), from https://nutanixbible.com/.
Oitras, Steven. "The Nutanix Bible" (Jan. 3, 2018), from https://nutanixbible.com/.

* cited by examiner

```
vm_create()

vm_config { "uuid" : "", "version" : "", "name": "", "annotation": "", "flavor": "vm_flavor", "power_state":
"vm_power_state", "nic_list": ["nic_config>uuid"], "disk_list": ["vdisk_config>uuid"], "ha_priroity": "",} vm_flavor { "num_vcpus": "", "num_cores_per_vcpu": "", "memory_mb": "",} vm_power_state { "on": "1", "off": "2",} nic_config { "uuid": "", "version": "", "name": "", "annotation": "", "mac_addr": "", "vlan_type":
"vlan_config", "ip_address": "", "network_config_uuid": "network_config>uuid",} vlan_config { "access": "1", "trunk": "2", "vlan_id": "",1} vdisk_config { "uuid": "", "version": "", "bus": "", "index": "", "vmdisk_data":
"pithos_vdisk_nfs_path", "vmdisk_size": "", "shared": "", "volume_group_uuid": "volume_config>uuid",}
```

FIG. 6

SYSTEM AND METHOD FOR TRANSLATING AFFLICTION PROGRAMMING INTERFACES FOR CLOUD PLATFORMS

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The one or more virtual machines utilize the hardware resources of the underlying one or more host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, present day virtual computing systems still have limitations due to their configuration and the way they operate.

SUMMARY

In accordance with at least some aspects of the present disclosure, a method is disclosed. The method includes receiving, by a computing system, a request to call a requested application programming interface (API) at a target cloud platform, from a plurality of cloud platforms. The method further includes determining, by the computing system, that the requested API is unsupported by the target cloud platform. The method also includes generating, by the computing system, responsive to determining that the requested API is unsupported by the target cloud platform, a set of workflows associated with the requested API. The method additionally includes generating a set of tasks common to the plurality of cloud platforms based on the set of workflows. The method additionally includes generating, by the computing system, a set of target APIs associated with the target cloud platform based on the set of tasks and an identity of the target cloud platform. The method also includes communicating, by the computing system, the set of target APIs to the target cloud platform.

In accordance with some other aspects of the present disclosure, a system is disclosed. The system includes a controller communicably coupled to a plurality of cloud platforms, configured to receive a request to call a requested application programming interface (API) at a target cloud platform from the plurality of cloud platforms. The controller is further configured to determine that the requested API is unsupported by the target cloud platform. The controller is also configured to generate, responsive to determination that the requested API is unsupported by the target cloud platform, a set of workflows associated with the requested API. The controller is additionally configured to generate a set of tasks common to the plurality of cloud platforms based on the set of workflows. The controller is further configured to generate a set of target APIs associated with the target cloud platform based on the set of tasks and an identity of the target cloud platform. The controller is also configured to communicate the set of target APIs to the target cloud platform.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 6 shows an example requested application programmable interface, in accordance with some embodiments of the present disclosure.

Figure 1:
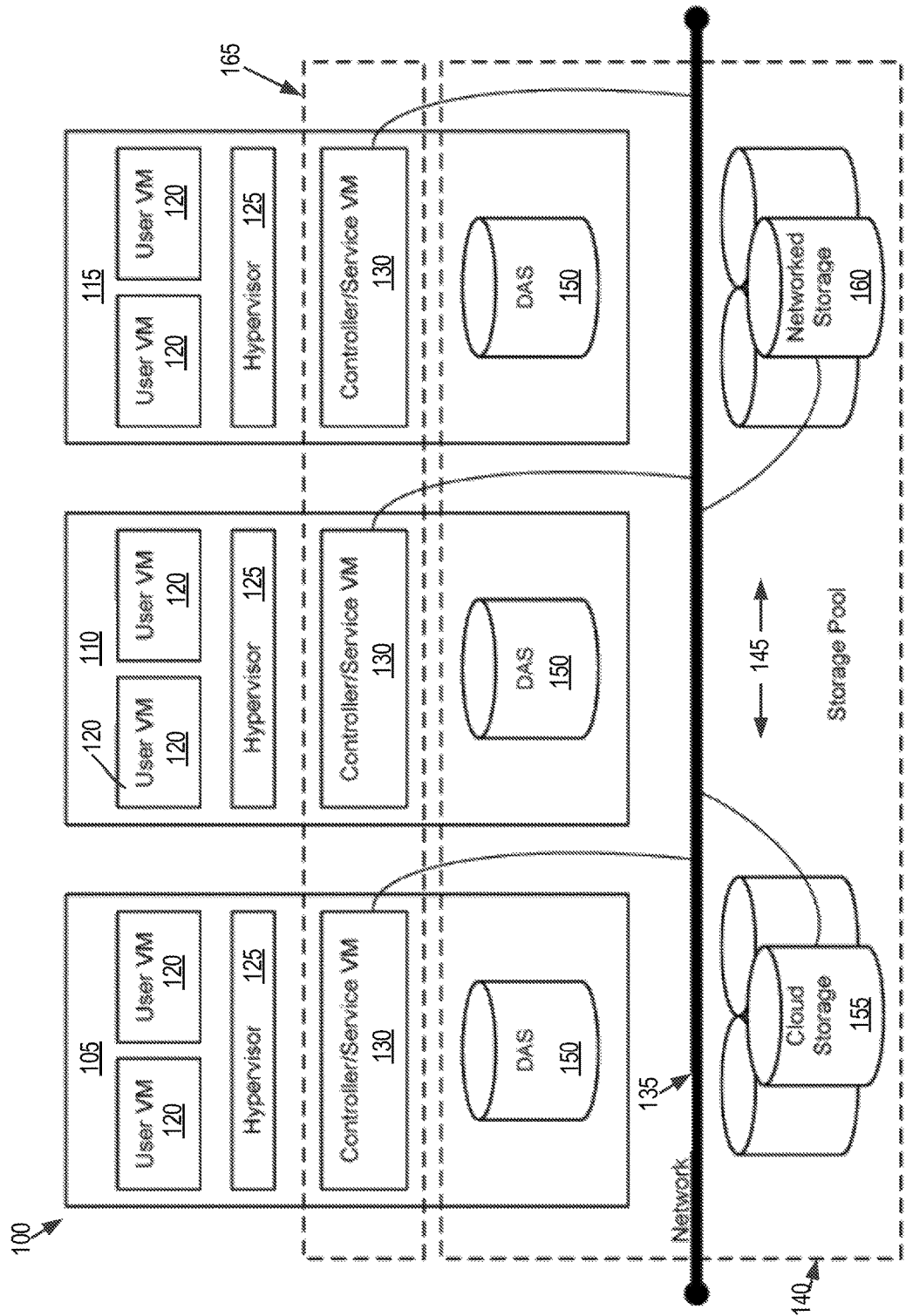
FIG. 1 is a block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to operating a cluster of computing nodes communicating with cloud platforms. The computing node can include a hypervisor, one or more virtual machines, a virtual machine management module, and one or more controller virtual machines. The controller virtual machine can operate the input and output operation to the cloud platforms from the computing node. The virtual management module can create and manage one or more virtual machines on the cloud platforms. The creation and management of the virtual machines can be carried out by a user interface or by an application programming interface (API) associated with the cloud platform.

One technical problem encountered in such computing systems is the incompatibility between APIs associated with different cloud platforms. For example, an API for say the Amazon Web Services (AWS) cloud platform may not be compatible with the Microsoft Azure cloud platform or the Acropolis cloud platform. The incompatibility between the APIs can result in limiting VM management operations configured for one cloud platform to only that cloud platform. To provide the VM management operations to work with other cloud platforms may need additional resources to redesign or recode the operations, thereby reducing the efficiency of the computing system. Alternatively, the management module may need to store and run cloud specific APIs for each cloud platform on which the management module executes VM management operations. This requirement can result in increased storage and size and/or reduced execution speed of the VM management operations.

The discussion below provides at least one technical solution to the technical problems mentioned above. For example, the computing system discussed below includes cloud interface that can translate APIs of one cloud platform into corresponding APIs of other cloud platforms. In addition, the cloud interface can provide universal APIs that can be translated into cloud platform specific APIs. The VM management module can either call a universal API or an API associated with one of the cloud platforms to run on a target cloud platform. The cloud interface can translate the received API into target APIs that can be run on the target cloud platform. The VM management module can be allowed to call APIs associated with one cloud platform while allowing the VM management module to request running those APIs at a another cloud platform. This alleviates the need for any modifications to the VM management module, or for inclusion of additional APIs in the VM management module for each cloud platform. This, in turn, can improve the speed and performance of the computer system.

Referring now to FIG. 1, a virtual computing system 100 is shown, in accordance with some embodiments of the present disclosure. The virtual computing system 100 may be part of a datacenter. The virtual computing system 100 includes a plurality of nodes, such as a first node 105, a second node 110, and a third node 115. Each of the first node 105, the second node 110, and the third node 115 includes user virtual machines (VMs) 120 and a hypervisor 125 configured to create and run the user VMs. Each of the first node 105, the second node 110, and the third node 115 also includes a controller/service VM 130 that is configured to manage, route, and otherwise handle workflow requests to and from the user VMs 120 of a particular node. The controller/service VM 130 is connected to a network 135 to facilitate communication between the first node 105, the second node 110, and the third node 115. Although not shown, in some embodiments, the hypervisor 125 may also be connected to the network 135.

The virtual computing system 100 may also include a storage pool 140. The storage pool 140 may include network-attached storage 145 and direct-attached storage 150. The network-attached storage 145 may be accessible via the network 135 and, in some embodiments, may include cloud storage 155, as well as local storage area network 160. In contrast to the network-attached storage 145, which is accessible via the network 135, the direct-attached storage 150 may include storage components that are provided within each of the first node 105, the second node 110, and the third node 115, such that each of the first, second, and third nodes may access its respective direct-attached storage without having to access the network 135.

It is to be understood that only certain components of the virtual computing system 100 are shown in FIG. 1. Nevertheless, several other components that are commonly provided or desired in a virtual computing system are contemplated and considered within the scope of the present disclosure. Additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater or fewer than three nodes may be used. Likewise, although only two of the user VMs 120 are shown on each of the first node 105, the second node 110, and the third node 115, in other embodiments, the number of the user VMs on the first, second, and third nodes may vary to include either a single user VM or more than two user VMs. Further, the first node 105, the second node 110, and the third node 115 need not always have the same number of the user VMs 120. Additionally, more than a single instance of the hypervisor 125 and/or the controller/service VM 130 may be provided on the first node 105, the second node 110, and/or the third node 115.

Further, in some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100.

Each of the first node 105, the second node 110, and the third node 115 may also be configured to communicate and share resources with each other via the network 135. For example, in some embodiments, the first node 105, the second node 110, and the third node 115 may communicate and share resources with each other via the controller/service VM 130 and/or the hypervisor 125. One or more of the first node 105, the second node 110, and the third node 115 may also be organized in a variety of network topologies, and may be termed as a "host" or "host machine."

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 140, as well as with other elements of the respective first node 105, the second node 110, and the third node 115 to receive, send, and process information, and to control the operations of the underlying first, second, or third node. The processing units may retrieve a set of instructions from the storage pool 140, such as, from a permanent memory device like a read only memory (ROM) device and copy the instructions in an executable form to a temporary memory device that is generally some form of random access memory (RAM). The ROM and RAM may both be part of the storage pool 140, or in some embodiments, may be separately provisioned from the storage pool. Further, the processing units may include a single stand-alone processing unit, or a plurality of processing units that use the same or different processing technology.

With respect to the storage pool 140 and particularly with respect to the direct-attached storage 150, it may include a variety of types of memory devices. For example, in some embodiments, the direct-attached storage 150 may include, but is not limited to, any type of RAM, ROM, flash memory, magnetic storage devices (e.g., hard disk, floppy disk, magnetic strips, etc.), optical disks (e.g., compact disk (CD), digital versatile disk (DVD), etc.), smart cards, solid state devices, etc. Likewise, the network-attached storage 145 may include any of a variety of network accessible storage (e.g., the cloud storage 155, the local storage area network 160, etc.) that is suitable for use within the virtual computing system 100 and accessible via the network 135. The storage pool 140 including the network-attached storage 145 and the direct-attached storage 150 may together form a distributed storage system configured to be accessed by each of the first node 105, the second node 110, and the third node 115 via the network 135 and the controller/service VM 130, and/or the hypervisor 125. In some embodiments, the various storage components in the storage pool 140 may be configured as virtual disks for access by the user VMs 120.

Each of the user VMs 120 is a software-based implementation of a computing machine in the virtual computing system 100. The user VMs 120 emulate the functionality of a physical computer. Specifically, the hardware resources, such as processing unit, memory, storage, etc., of the underlying computer (e.g., the first node 105, the second node 110, and the third node 115) are virtualized or transformed by the hypervisor 125 into the underlying support for each of the plurality of user VMs 120 that may run its own operating system and applications on the underlying physical resources just like a real computer. By encapsulating an entire machine, including CPU, memory, operating system, storage devices, and network devices, the user VMs 120 are compatible with most standard operating systems (e.g. Windows, Linux, etc.), applications, and device drivers. Thus, the hypervisor 125 is a virtual machine monitor that allows a single physical server computer (e.g., the first node 105, the second node 110, third node 115) to run multiple instances of the user VMs 120, with each user VM sharing the resources of that one physical server computer, potentially across multiple environments. By running the plurality of user VMs 120 on each of the first node 105, the second node 110, and the third node 115, multiple workloads and multiple operating systems may be run on a single piece of underlying hardware computer (e.g., the first node, the second node, and the third node) to increase resource utilization and manage workflow.

The user VMs 120 are controlled and managed by the controller/service VM 130. The controller/service VM 130 of each of the first node 105, the second node 110, and the third node 115 is configured to communicate with each other via the network 135 to form a distributed system 165. The hypervisor 125 of each of the first node 105, the second node 110, and the third node 115 may be configured to run virtualization software, such as, ESXi from VMWare, AHV from Nutanix, Inc., XenServer from Citrix Systems, Inc., etc., for running the user VMs 120 and for managing the interactions between the user VMs and the underlying hardware of the first node 105, the second node 110, and the third node 115. The controller/service VM 130 and the hypervisor 125 may be configured as suitable for use within the virtual computing system 100.

The network 135 may include any of a variety of wired or wireless network channels that may be suitable for use within the virtual computing system 100. For example, in some embodiments, the network 135 may include wired connections, such as an Ethernet connection, one or more twisted pair wires, coaxial cables, fiber optic cables, etc. In other embodiments, the network 135 may include wireless connections, such as microwaves, infrared waves, radio waves, spread spectrum technologies, satellites, etc. The network 135 may also be configured to communicate with another device using cellular networks, local area networks, wide area networks, the Internet, etc. In some embodiments, the network 135 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. If the leader node fails, another leader node may be designated. Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 140 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120 that are part of a cluster may be configured to share resources with each other.

Figure 2:
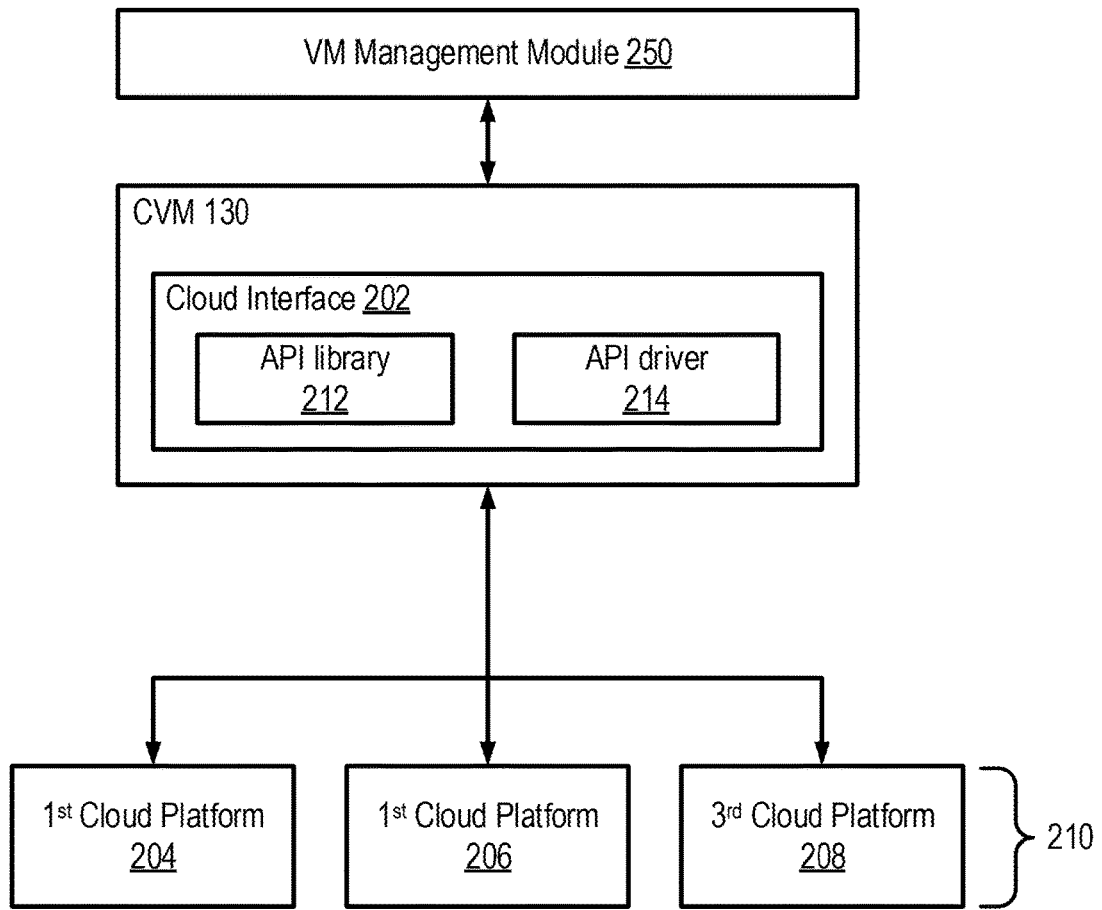
FIG. 2 shows additional details of a controller virtual machine shown in FIG. 1, in accordance with some embodiments of the present disclosure.

FIG. 2 shows additional details of the controller virtual machine (CVM) 200, in accordance with some embodiments of the present disclosure. In particular, the CVM 200 can be used to implement at least a portion of the CVM 130 shown in FIG. 1. The CVM 200 can include a cloud interface 202 that provides an interface to one or more cloud platforms, such as a first cloud platform 204, a second cloud platform 206, and a third cloud platform 208 (collectively referred to herein as "the cloud platforms 210"). The cloud interface 202 can provide an API library 212 and an API driver 214. The API library 212 can provide several APIs for running operations on the cloud platforms. The API driver 214 processes the APIs based, in part, on the nature of the API and the cloud platform on which an application associated with the API is to be executed. The cloud interface 202 can provide the APIs in the API library 212 to the user VMs 120 or to a virtual machine (VM) management module 250 that manages the user VMs 120 running on one of the cloud platforms. For example, referring to FIG. 1, one or more of the user VMs 120 may be run on any one of the cloud platforms 210. The functionality of the user VMs 120 running in the cloud can be managed by the VM management module 250. For example, the VM management module 250 may carry out several management operations such as VM management operations, image management operations, volume management, and virtual network management.

As mentioned above, the API library 212 can include APIs that allow a VM management module 250 to run and manage user VMs 120 on the cloud platforms 210. The API library 212 can include APIs related to VM creation and VM management on the cloud platforms 210. These APIs can be specific to the particular one of the cloud platforms 210 that the API is associated with. For example, the API library 212 can include a first set of APIs specific to the first cloud platform 204, a second set of APIs associated with the second cloud platform 206 and a third set of APIs associated with the third cloud platform 208. Each of the first, the second, and the third set of APIs can include VM creation and management APIs that are specific to their respective cloud platforms. In some instances, the first set of APIs, associated with the first cloud platform 204 may not run on the second or the third cloud platform 206 and 208. For example, assuming the first cloud platform 204 is an Amazon Web Services (AWS) cloud platform, the second cloud platform is a Microsoft Azure cloud platform, and the third cloud platform 208 is a Nutanix Acropolis cloud platform, the first set of APIs associated with the AWS cloud platform may not run on the second and the third cloud platform 206 and 208. This limitation is typically due to the specific format in which calls to APIs on one cloud platform differ from calls to APIs on other cloud platforms. In such instances, the VM management module 250 would have to be re-written or re-programmed to use APIs associated with the second and the third cloud platform.

The API driver 214 alleviates the need for the VM management module 250 to be re-written or re-programmed to use APIs associated with different cloud platforms. This allows the VM management module 250 to use APIs associated with one cloud platform to carry out operations on a different cloud platform. For example, the VM management could use an API associated with the AWS cloud platform to run operations on the Microsoft Azure or the Nutanix Acropolis cloud platforms. The API driver 214 can translate the APIs associate with one cloud platform into APIs associated with the cloud platform on which the VM management module 250 has directed the API to run. For example, the cloud interface 202 can receive from the VM management module 250 a call to an API associated with the Acropolis cloud platform to create a virtual machine on the AWS cloud platform. The API driver 214 can translate the API associated with the Acropolis cloud platform into a corresponding API associated with the AWS cloud platform, and run the translated API on the AWS platform.

Figure 3:
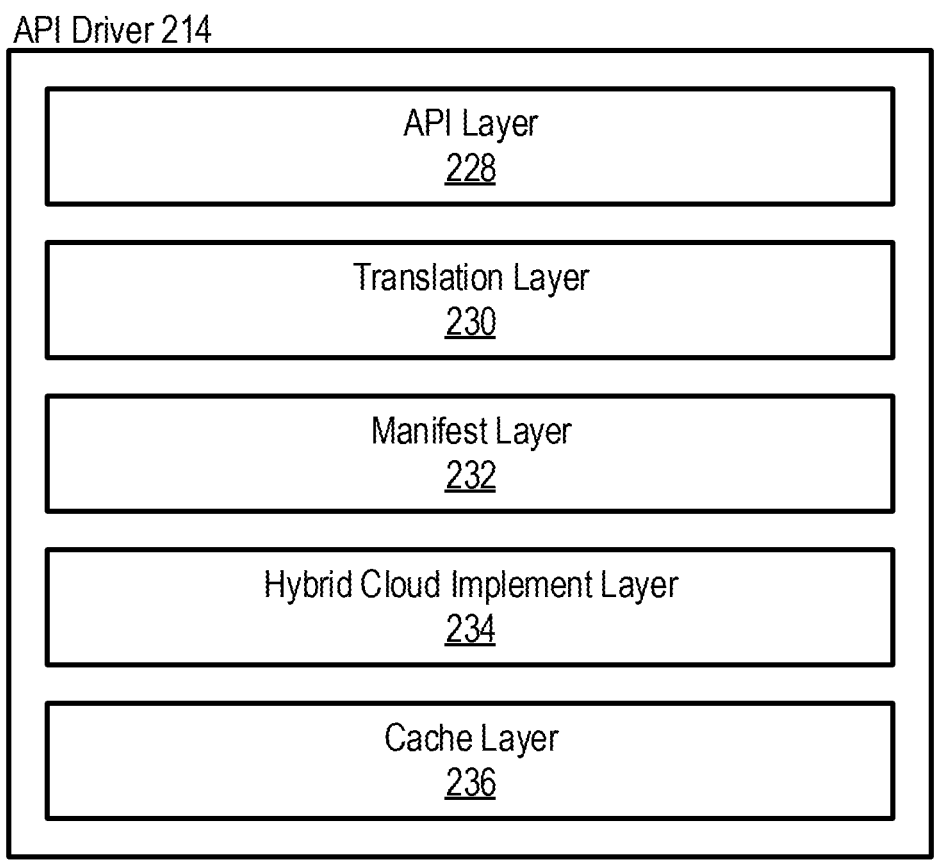
FIG. 3 shows an example architecture of an application programming interface driver shown in FIG. 2, in accordance with some embodiments of the present disclosure.

FIG. 3 shows an example architecture of the API driver 214 shown in FIG. 2. In particular, the API driver 214 can include an API layer 228, a translation layer 230, a manifest layer 232, a hybrid cloud implementation layer 234, and a cache layer 236. The API layer 228 provides a layer of APIs which can be called by the VM management module 250. In one or more embodiments, the API layer 228 can present the APIs that are included in the API library 212. In particular, the API layer 228 can receive calls for APIs associated with the first, second, and the third cloud platform 204, 206, and 208 that are included in the API library 212. As mentioned above, the API library 212 can provide APIs for various management functions related to creating and running VMs on the cloud platforms 210. For example, the API library 212 can include APIs related to VM management. One example of a VM management APIs on the AWS cloud platform includes "CreateLaunchTemplate," which can be used to launch an instance of a virtual machine on the AWS cloud platform. One example of the VM management APIs on the Azure cloud platform includes "PUT" command in addition to an appropriate "Request URI." One example of the VM management APIs on the Acropolis cloud platform includes "CreateClone," which can create a new VM from an existing VM. Other cloud platforms can include their own VM management APIs which can be made available by the API library 212.

The VM management module 250 can call an API associated with one of the cloud platforms 210 to perform similar operations on another one of the cloud platforms 210. For example, the VM management module 250 can call the "CreateLaunchTemlate," API, which as discussed above is an API associated with the AWS cloud platform, to create a virtual machine on another cloud platform, such as the Microsoft Azure, or the Acropolis. The API layer 228 can accept the calls for the API and translate the API to the appropriate API of the targeted cloud platform.

The API library 212 may also include universal APIs in addition to those associated with the cloud platforms 210. For example, the API library 212 may include VM management universal APIs, which when called, can execute management functions on any one of the cloud platforms 210. For example, the API library 212 can include universal APIs such as, for example, vm_create( ) for creation of a new virtual machine, vm_on( ) for activating a virtual machine, vm_off( ) for deactivating a virtual machine. The API library 212 can include several additional VM management universal APIs. The API layer 228 can receive calls to the universal APIs from the VM management module 250 or some other program. Similar to translating the cloud platform specific APIs, as discussed above, the API driver 214 can translate the universal APIs into APIs associated with the target cloud platform.

The translation layer 230 translates APIs called by the VM management module 250 into a set of tasks or workflows that can be implemented for the requested API. The set of tasks or workflows can be common tasks or workflows that can be implemented on any of the cloud platforms 210. On the other hand, based on the type of API called by the VM and the requested target cloud platform, the tasks or workflows can be specific to a particular cloud platform. For example, as discussed above, the API layer 228 can receive calls for APIs associated with one of the cloud platforms 210. The translation layer 230 can determine the identity of the API being called based on the API request. As mentioned above, the VM management module 250 can call an API associated with any one of the cloud platforms 210 or can call a universal API. The VM management module 250 can send a request to run a specified API on a specified target cloud platform. The translation layer 230 can determine the identity of the API as well as the target cloud platform on which the API has been requested. In one or more embodiments, the identity of the API can be determined based on a universally unique ID (e.g., a "uuid") associated with the API. Typically, most APIs will include an uuid specific to that API. The translation layer 230 can compare the uuid to a table or a database to determine the identity of the cloud platform associated with the API. In one or more embodiments, the translation layer 230 can determine the identity of the API based on the name of the API. For example, if the API requested is the "CreateLaunchTemplate" API mentioned above, the translation layer 230 can determine that the requested API is associated with the AWS cloud platform.

The translation layer 230 can determine the target cloud platform based on the information included in the API call. For example, the identity of the target cloud platform can be included in the API call in the form of a string or an encoded string, character, or number, denoting the target cloud platform. For example, the call can include a string such as "AWS" identifying the target cloud platform as being AWS, or can include a number (e.g., "1" denoting AWS, "2" denoting Azure, etc.) which can be looked up to determine the target cloud platform.

In instances where the target cloud platform is same as the cloud platform associated with the requested API, then the translation layer 230 can determine that a translation of the API may not be needed. For example, if the target API is the AWS cloud platform, which is the same platform with which the "CreateLaunchTemplate" API is associated, then the translation layer 230 can determine that no translation of this API is needed to run that API on the AWS cloud platform. Alternatively, the translation layer 230 may determine that a translation of the requested API may be needed if the target cloud platform is not the same as the cloud platform associated with the requested API. As a result, the requested API may not be supported by the target cloud platform. The translation layer 230 may also determine that a translation is needed if the requested API is a universal API, which is a set of APIs provided by the API library 212 that are not associated with any cloud platform, but can be translated to run on any cloud platform.

Figure 4:
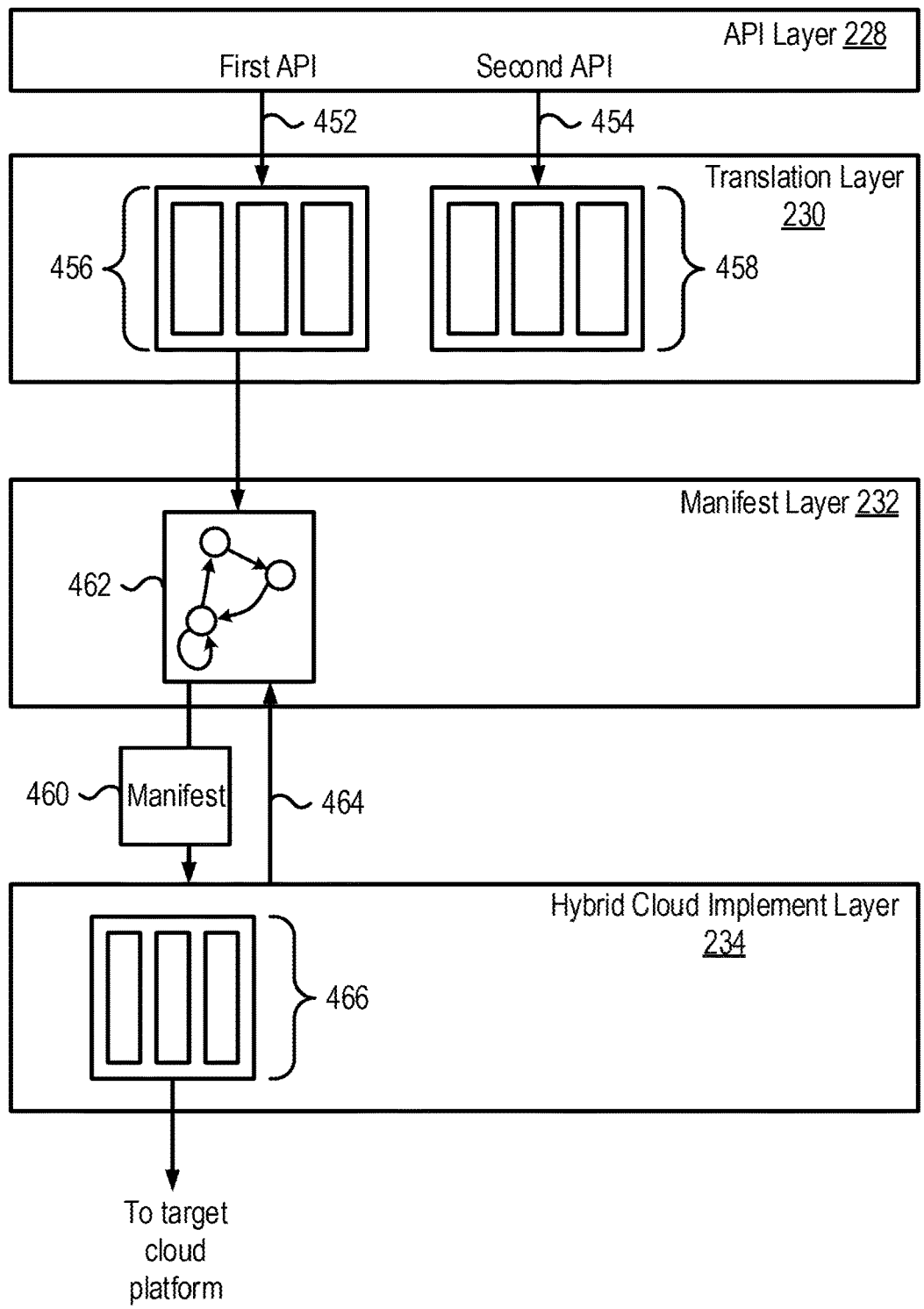
FIG. 4 depicts additional details of the example architecture of the application programming interface driver shown in FIG. 3, in accordance with some embodiments of the present disclosure.

The translation layer 230 can translate the requested API (a cloud specific API or a universal API that us unsupported by the target cloud platform) into a corresponding set of tasks or workflows. Referring to FIG. 4, which depicts additional details of the API driver 214 shown in FIG. 3, the translation layer 230 receives a first API 452 and a second API 454 from the API layer 228. The translation layer 230 can translate the first API 452 and the second API 454 into their respective set of tasks or workflows. In particular, the translation layer 230 can translate the first API 452 into a first set of workflows 456 and can translate the second API 454 into a second set of workflows 458. The first set of workflows 456 can correspond to common tasks or workflows associated with the requested API. For example, the first set of workflows 456 can include common workflows that any cloud computing platform would carry out to implement the first API 452. That is, the common tasks or workflows may be performed whether the target cloud platform is AWS, Azure, Acropolis, or any other cloud platform. As an example, a vm_create( ) API received by the translation layer 230 can include several common tasks such as configuring a network interface card (NIC) of the virtual machine, configuring a virtual local area network (vlan), configuring disk space, configuring a flavor (e.g., number of central processing units (CPUs), number of memory banks, etc.), and the like. The translation layer 230 can store in memory a mapping between the APIs provided by the API layer 228 and the associated common tasks or workflows. In this manner, the translation layer 230 can generate the common tasks or workflows, such as the first set of workflows 456 and the second set of workflows 458, associated with the requested APIs.

The translation layer 230, in generating the common tasks or workflows, can retain values of parameters provided in the API request. For example, the translation layer 230 can retain values of parameters such as disk sizes, number of CPUs, memory sizes, number of NICs, etc., that may be specified with particular values, and include the values in the corresponding set of common tasks or workflows. Thus, the parameters in the common tasks or workflows can have the same values at that of their corresponding parameters in the requested APIs. The translation layer 230 can provide the values of the parameters to the manifest layer 232 in addition to the common tasks or workflows.

The translation layer 230 can provide the first and second set of workflows 456 and 458 to the manifest layer 232.

Referring to FIG. 4, the manifest layer 232 can maintain a state machine for the set of workflows. In particular, the manifest layer 232 can maintain a state machines that track the state of one or more workflows received from the translation layer 230. The state machines can represent a sequence or pattern of steps or tasks that are to be completed for the execution of the common tasks or workflows received from the translation layer 130. The state machines can be expressed in the form of a manifest file that can be provided to the hybrid cloud implementation layer 234 for implementation. Referring to FIG. 4, the manifest layer 232 receives the first set of workflows 456 from the translation layer 230, and generates one or more manifests 460 that describe discrete steps or tasks that are to be executed to implement one or more workflows (while not shown in FIG. 4, the manifest layer 232 can similarly generate one or more manifests that describe the discrete steps or tasks that are to be executed to implement the second set of workflows 458).

The discrete steps or tasks can be common to the cloud platforms. That is the discrete steps or tasks may not be cloud platform specific. The discrete tasks or steps can be sequential or can be non-sequential. The sequential discrete tasks or steps can be represented in the form of a state machine or a flow chart 462, which can describe the sequence of tasks or steps that can be executed based on the current state and the inputs received. As an example, if the first set of workflows 456 includes a set of tasks to create a virtual machine, the set of tasks may include configuring a flavor of the virtual machine, configuring a NIC of the virtual machine, configuring the virtual LAN of the virtual machine, configuring the disk allocation of the virtual machine, etc. In some example implementations, these tasks may be carried out in a particular sequence, such as, the configuration of the NIC preceding the configuration of the virtual LAN. The manifest layer 232 can receive a first input 464 from the hybrid cloud implementation layer 234, which can be used to determine a change of state of the state machine 462. The first input 464 can include, for example, information received from an API server of one or more cloud platforms 210 in response to requesting to run an API at the cloud platforms 210. In some implementations, the information can be acknowledgements, error messages, status messages, and data, received from the API server of the cloud platforms, which may indicate success or failure of the requested API.

The manifest layer 232 can maintain the statuses of the sets of workflows received from the translation layer 230. The cloud interface 202 can receive messages including acknowledgements, error messages, status messages, and data, from the API server of the target cloud platform. These messages can indicate the status of an API request sent to the cloud platforms, and therefore the status of the associated workflows maintained by the manifest layer 232. For example, the an acknowledgement message can indicate that the target cloud platform has received the API request. An error message can indicate that the API request was not accepted by the target cloud platform. A data message can include data pertaining to the API request sent to the target cloud platform. These messages, as discussed above, can be provided to the manifest layer 232 by the hybrid cloud implementation layer 234. The manifest layer 232 can maintain the statuses of workflows associated with the API requests sent by the cloud interface 202 to the cloud platforms 210. In one or more implementations, the manifest layer 232 can maintain a table that lists the current status of each API or workflow received by the API driver 214. The table can include status indicators such as, for example, Pending, Error, Success, and Failure associated with each API or workflow. The table may also include statuses associated with each task or discrete step associated with a workflow or API request. In some implementations the table can be a key value store, where the key can include an uuid of the requested API, and the value can include one of the corresponding status indicators discussed above.

As mentioned above, the manifest layer 232 can generate a manifest or specification that describes the tasks or steps that correspond to the implementation of one or more workflows, such as the first workflow 456. The first manifest 460 can be a described in a format that can be parsed by the hybrid cloud implementation layer 234. In one or more embodiments, the manifest layer 232 can generate the first manifest 460 in a JavaScript Object Notification (JSON) format, a YAML Ain't Markup Language (YAML) format, or any other human readable markup language. The first manifest 460 also can include information regarding the target cloud platform included in the first API 452. The information of the target cloud platform can be used by the hybrid cloud implementation layer 234 to run APIs on the appropriate cloud platforms.

The hybrid cloud implementation layer 234 can parse the first manifest 460 to determine the tasks that are to be executed at a cloud platform to implement the requested first API 450. The hybrid cloud implementation layer 234 can also determine the target cloud platform on which the user desired the first API to be run. As mentioned above, the first manifest 460 can include a set of tasks or workflows that correspond to one or more workflows. The hybrid cloud implementation layer 234 can parse the first manifest 460 to determine each task specified by the first manifest 460. For example, with reference to the example of "vm_create( )" discussed above, the first manifest 460 can include a set of tasks such as configuring a flavor of the virtual machine, configuring a NIC of the virtual machine, configuring the virtual LAN of the virtual machine, configuring the disk allocation of the virtual machine, etc. The hybrid cloud implementation layer 234 can pares the first manifest 460 to identify these tasks. In addition, the hybrid cloud implementation layer 234 can determine the target cloud platform specified by the first API 452. Based on the determined tasks and the target cloud platform, the hybrid cloud implementation layer 234 can determine the appropriate API or a set of APIs 466 specific to the target cloud platform that when executed on the cloud platform can accomplish the identified tasks. In some embodiments, the hybrid cloud implementation layer 234 can maintain a list of tasks to API mappings, which can allow the selection of APIs corresponding to the tasks and the target cloud platform. For example, the hybrid cloud platform can look up an identity of a task and the identity of the target cloud platform in a table, and select the associated API as the API to be run on the target cloud platform.

The hybrid cloud implementation layer 234 can use the determined APIs and communicate with the target cloud platform to run the determined APIs. The hybrid cloud implement 234 can use the values of the parameters specified in the first manifest 460 to provide values to the parameters in the determined APIs. In one or more embodiments, the hybrid cloud implementation layer 234 can communicate the determined APIs to the API server of the target cloud platform. In some embodiments, the API server can allow communications using a REST APIs interface. In some such implementations, the hybrid cloud implementation layer 234 may access scripts for executing the determined APIs using the REST protocol. In one example, the hybrid cloud implementation layer 234 can execute a "PUT" command, followed by the determined API and the parameters, to execute an API on the API server of the target cloud platform.

The API driver 214 may also include a cache layer 236. The cache layer 236 can maintain a state of at least one object in memory. In particular, the cache layer 236 can maintain the states of objects such as, for example, the VMs, created on the cloud platforms. In one or more embodiments, the cache layer 236 can include a state table that lists at least one object by their object IDs, and their corresponding state. The table can include states such as Pending, Success, Failure, and Error. In one or more embodiments, the cache layer 236 In one or more embodiments, the cache layer 236 can update the state of the objects based on the changes in the corresponding state of the objects in one the respective cloud platform.

In one or more embodiments, the first node 105 (FIG. 1) can utilize the cache layer 236 to determine the state of the objects, instead of requesting the states of the objects from the cloud platforms 210. For example, the VM management module 250 or the hypervisor 125 may send requests to the cloud platforms 210 to determine the state of the objects. The cloud platforms 210 can then respond to the request with the state of the requested objects. However, communicating with the cloud platforms 210 can be time consuming. On the other hand, communicating with the cache layer 236, which is located at the first node 105, can be relatively faster. Thus, the VM management module 250 or the hypervisor 125 can access the state of the objects more quickly from the cache layer 236 than from the cloud platforms 210, thereby improving the performance of the first node 105.

Figure 5:
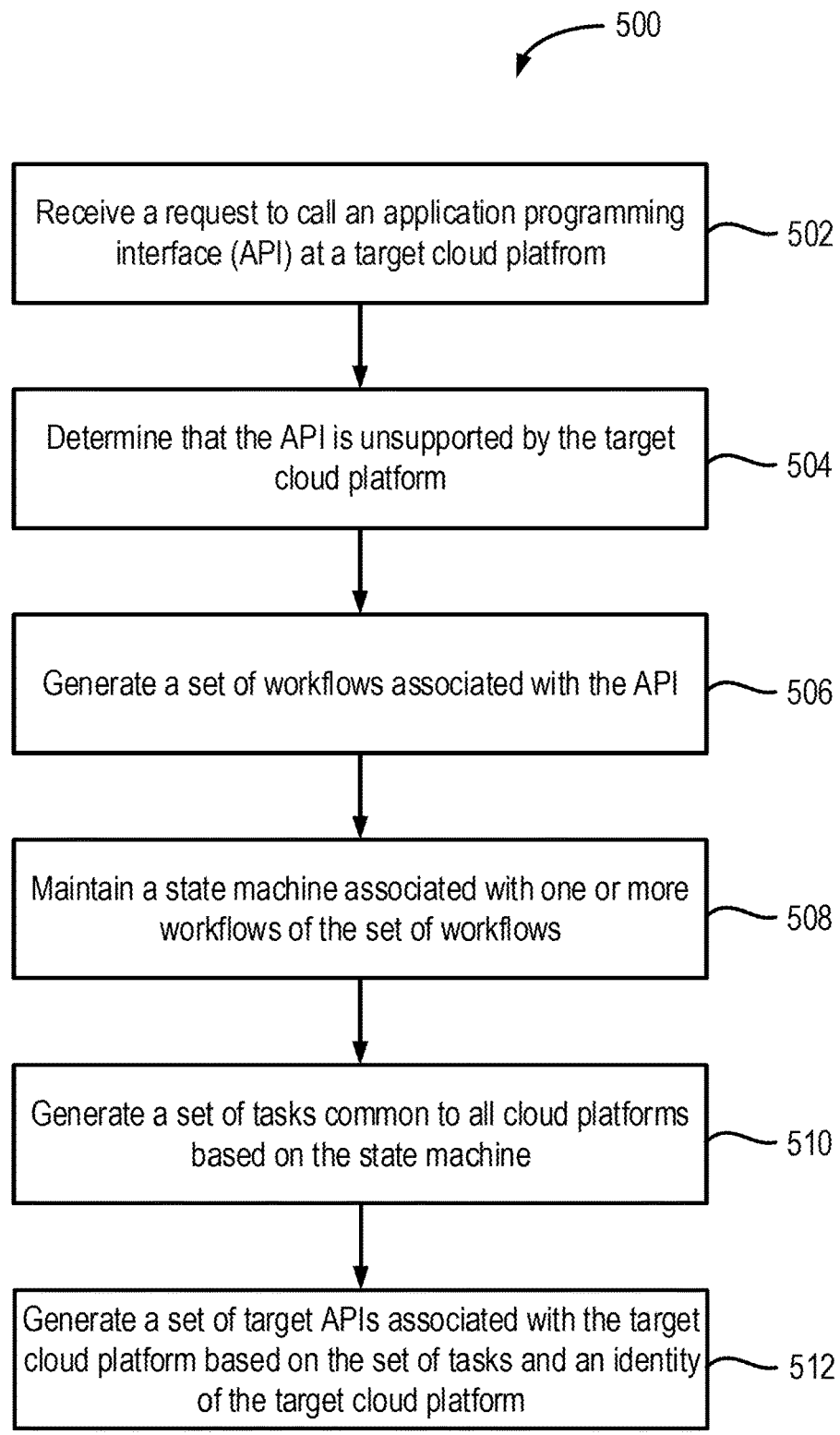
FIG. 5 shows a flow diagram of an example process for application programming interface translation, in accordance with some embodiments of the present disclosure.

FIG. 5 shows a flow diagram of an example process 500 for API translation. Additional, fewer, or different operations may be performed depending on the implementation. In one or more embodiments, the process 500 can be executed by one or more processors at a node, such as nodes 105, 110, 115 (FIG. 1), and the CVM 200 (FIG. 2). In one or more embodiments, the process 500 can be executed by a controller virtual machine, such as the CVM 130 discussed above in relation to FIGS. 1 and 2. The process 500 includes receiving a request to call an API at a target cloud platform (502). At least one example of this operation of process 500 has been discussed above in relation to FIGS. 1-4. For example, the API driver 214, shown in FIGS. 2-4, can receive a call to run a requested API on a target cloud platform. The API can include an API provided by the API library 212, which includes APIs associated with or supported by the cloud platforms 210 as well as universal APIs that can be translated into APIs supported by one or more of the cloud platforms 210. The requested API can be related to VM operations such as, for example, VM management, image management, volume management, and virtual network management. FIG. 6 shows an example API that the API driver 214 can receive for translation. In particular, FIG. 6 shows a request API for creating a virtual machine: "vm_create( )" and the associated parameters. An actual "vm_create( )" request API can include specific values for the various listed parameters. The values of these parameters can specify various aspects of the virtual machine, such as the flavor, the power state, the NIC configuration, the VLAN configuration, and the disk configuration. The CVM 130 can include an API server that provides an API interface, such as an REST API interface, through which the requested APIs, such as the "vm_create( )" API along with the parameter values can be received. As an example, a user or a virtual machine can enter a "PUT" command to send the "vm_create( )" request to the API server of the CVM 130. The CVM 130, in addition to the API request can also receive information of the target cloud platform on which the requested API is to be executed.

The process 500 includes determining that the API is unsupported by the target cloud platform (504). At least one example of this operation of process 500 has been discussed above in relation to FIGS. 1-4. As discussed above in relation to FIG. 4, the translation layer 230 can determine the identity of the requested API, and based on the identity determine whether the requested API is supported by the target cloud platform. For example, translation layer 230 may determine that the requested API is supported by the AWS cloud platform or is a universal API, and that the target cloud platform is the Microsoft Azure cloud platform. As a result, the translation layer 230 can determine that requested API would have to be translated prior to being run on the target cloud platform.

The process 500 also includes generating a set of workflows associated with the requested API (506). At least one example of this operation of process 500 has been discussed above in relation to FIGS. 1-4. As discussed above, the translation layer 230 can identify the requested API, and generate a set of workflows that are common to all cloud platforms and that are representative of the tasks associated with the requested API. The set of workflows can be common to all the cloud platforms. The translation layer 230 also can retain the values of the parameters specified in the requested API.

The process 500 further includes maintaining a state machine associated with one or more workflows of the set of workflows (508). At least one example of this operation of process 500 has been discussed above in relation to FIGS. 1-4. As discussed above, the manifest layer 232 can maintain a state machine associated with one or more set of workflows of the first set of workflows 456 generated by the translation layer 230. The state machine can represent a sequence of tasks that are to be completed for the execution of the common tasks or workflows received from the translation layer 230.

The process 500 also includes generating set of tasks common to the cloud platforms based on the state machine (510). At least one example of this operation of process 500 has been discussed above in relation to FIGS. 1-4. As discussed above, the manifest layer 232 can generate a set of tasks common to the cloud platforms based on the state machine or based on the set of workflows. The set of tasks can be sequential or non-sequential.

The process 500 further includes generating a set of target APIs associated with the target cloud platform based on the set of tasks and the identity of the target cloud platform (512). At least one example of this operation of process 500 has been discussed above in relation to FIGS. 1-4. As discussed above, the hybrid cloud implementation layer 234 can generate one or more APIs based on the set of tasks and the target cloud platform. For example, the hybrid cloud implementation layer 234 can look up one or more APIs based on the set of tasks and the target cloud platform. The hybrid cloud implementation layer 234 can call the determined APIs at the target cloud platform, where the determined APIs include values of the parameters that are based on the values of the parameters of the requested API. In one or more embodiments, the set of target APIs can include APIs such as "ec2.create_instance( )" provided by the AWS cloud platform, or other similar APIs provided by other cloud platforms such as Azure and Nutanix Acropolis.

Thus, the present disclosure provides systems and methods for translating requested APIs associated with one cloud platforms into APIs associated with another cloud platform. This enables the user to call APIs belonging to any cloud platform on a different cloud platform. As a result, the user does not have to reprogram APIs when moving or operating objects from one cloud platform to another cloud platform. The system also offers common APIs that are not specific to any cloud platform, and can be called for implementation on any cloud platform.

It is also to be understood that in some embodiments, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
by a computer system,
    receiving a request to call a requested application programming interface (API) at a target cloud platform;
    determining that the requested API is unsupported by the target cloud platform;
    generating responsive to determining that the requested API is unsupported by the target cloud platform, a first workflow associated with the requested API;
    generating a first task based on the first workflow;
    generating a first target API associated with the target cloud platform based on the first task and an identity of the target cloud platform;
    communicating the first target API to the target cloud platform;
    maintaining a first state associated with a first object associated with the first target API;
    receiving a status API directed to the target cloud platform for requesting a status of the first object; and
    responding to the status API with the maintained first state associated with the first object.

2. The method of claim 1, further comprising generating a target manifest including the first task and parsing the manifest for generating the first target API.

3. The method of claim 2, further comprising generating the target manifest based on a state machine representing the first workflow.

4. The method of claim 3, further comprising maintaining a status of the first workflow based on communication received from the target cloud platform in response to communicating the first target API.

5. The method of claim 1, further comprising retaining a value of a parameter provided by the request to call the requested API at the target cloud platform when generating the first workflow.

6. The method of claim 1, further comprising receiving a message from the target cloud platform responsive to communicating the first target API, and updating the first state associated with the first object based on the message received from the target cloud platform.

7. The method of claim 1, further comprising:
    maintaining a list of APIs for each of a plurality of cloud platforms, including the target platform, and
    looking up the list of APIs to determine target APIs associated with the target cloud platform based on the first task and the identity of the target platform.

8. The method of claim 1, wherein the requested API is associated with a virtual machine (VM) operation, including an image management operation, a VM volume management operation, or a virtual network management operation.

9. A system that manages a cloud computing environment, the system comprising:
    a controller communicably coupled to a plurality of cloud platforms, and having programmed instructions to:
        receive a request to call a requested application programming interface (API) at a target cloud platform;
        determine that the requested API is unsupported by the target cloud platform;
        generate, responsive to determination that the requested API is unsupported by the target cloud platform, a first workflow associated with the requested API;
        generate a first task based on the first workflow;
        generate a first target API associated with the target cloud platform based on the first task and an identity of the target cloud platform;
        communicate the first target API to the target cloud platform;
        maintains a first state associated with a first object associated with the first target API;
        receives a status API directed to the target cloud platform requesting a status of the first object; and
        respond to the status API with the maintained first state associated with the first object.

10. The system of claim 9, wherein the controller further generates a target manifest including the first task, and parses the manifest to generate the first target API.

11. The system of claim 10, wherein the controller further generates the target manifest based on a state machine representing the first workflow.

12. The system of claim 11, wherein the controller further maintains a status of the first workflow based on communication received from the target cloud computing platform in response to communicating the first target API.

13. The system of claim 9, wherein the controller further retains a value of a parameter provided by the request to call the requested API when generating the first workflow.

14. The system of claim 9, wherein the controller further receives a message from the target cloud platform responsive to the communication of the first target API, and update the first state associated with the first object based on the message received from the target cloud platform.

15. The system of claim 9, wherein the controller further maintains a list of APIs for each of a plurality of cloud platforms, including the target cloud platform, and look up the list of APIs to determine the first target API associated with the target cloud platform based on the first task and the identity of the target platform.

16. The system of claim 9, wherein the requested API is associated with a virtual machine (VM) operation, including an image management operation, a VM volume management operation, or a virtual network management operation.

17. A non-transitory computer readable media with computer-executable instructions embodied thereon that, when executed by a processor of a computing system, cause the computing system to perform a process comprising:
 receiving a request to call a requested application programming interface (API) at a target cloud platform;
 determining that the requested API is unsupported by the target cloud platform;
 generating responsive to determining that the requested API is unsupported by the target cloud platform, a first workflow associated with the requested API;
 generating a first task based on the first workflow;
 generating a first target API associated with the target cloud platform based on the first task and an identity of the target cloud platform;
 communicating the first target API to the target cloud platform;
 maintaining a first state associated with a first object associated with the first target API;
 receiving a status API directed to the target cloud platform for requesting a status of the first object; and
 responding to the status API with the maintained first state associated with the first object.

18. The non-transitory computer readable media of claim 17, further comprising generating a target manifest including the first task and parsing the manifest for generating the first target API.

19. The non-transitory computer readable media of claim 18, further comprising generating the target manifest based on a state machine representing the first workflow.

20. The non-transitory computer readable media of claim 19, further comprising maintaining a status of the first workflow based on communication received from the target cloud platform in response to communicating the first target API.

21. The non-transitory computer readable media of claim 17, further comprising retaining a value of a parameter provided by the request to call the requested API at the target cloud platform when generating the first workflow.

22. The non-transitory computer readable media of claim 17, further comprising receiving a message from the target cloud platform responsive to communicating the first target API and updating the first state associated with the first object based on the message received from the target cloud platform.

23. The non-transitory computer readable media of claim 17, further comprising:
 maintaining a list of APIs for each of a plurality of cloud platforms, including the target platform, and
 looking up the list of APIs to determine target APIs associated with the target cloud platform based on the first task and the identity of the target platform.

24. The non-transitory computer readable media of claim 17, wherein the requested API is associated with a virtual machine (VM) operation, including an image management operation, a VM volume management operation, or a virtual network management operation.

25. The non-transitory computer readable media of claim 17, wherein the first task comprises configuration of a network interface card.

26. The non-transitory computer readable media of claim 17, wherein the first task comprises configuration of disk allocation.

* * * * *